E. E. GOOD.
MILKING APPARATUS.
APPLICATION FILED OCT. 14, 1908.
920,129.
Patented May 4, 1909.
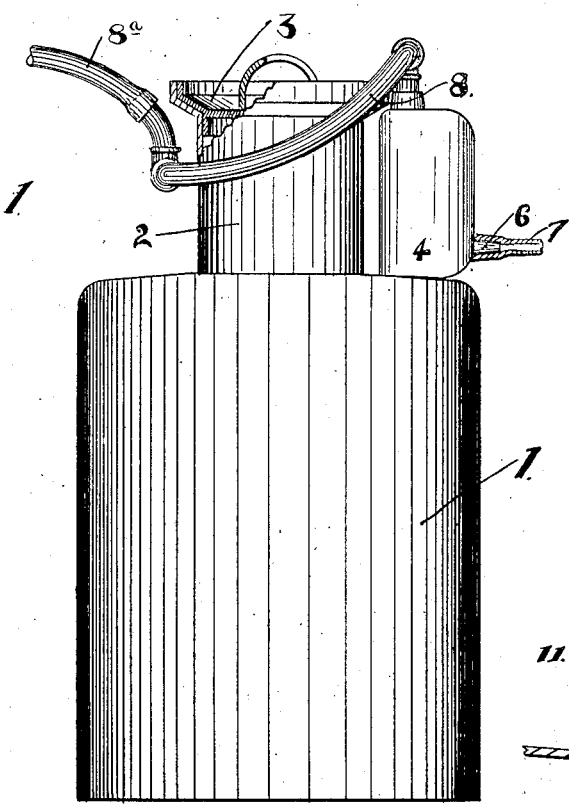
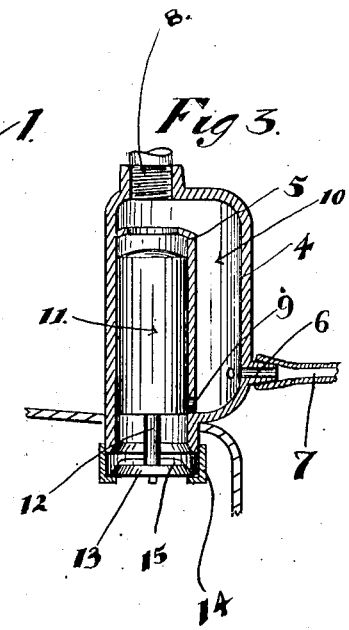
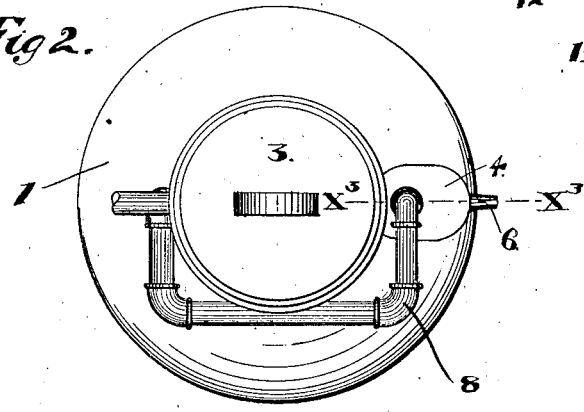
Witnesses:
R. P. Hicks
Harry Opsahl.
Inventor:
Ezra E. Good
By his Attorneys
Williamson Merchant

UNITED STATES PATENT OFFICE.

EZRA E. GOOD, OF WATERLOO, IOWA.

MILKING APPARATUS.

No. 920,129.      Specification of Letters Patent.      Patented May 4, 1909.

Application filed October 14, 1908. Serial No. 457,638.

*To all whom it may concern:*

Be it known that I, EZRA E. GOOD, a citizen of the United States, residing at Waterloo, in the county of Blackhawk and State of Iowa, have invented certain new and useful Improvements in Milking Apparatus; and I do hereby declare the following to be a full, clear, and exact description of the invention, such as will enable others skilled in the art to which it appertains to make and use the same.

My invention relates to milking apparatus of the type wherein pulsating devices are employed, and has for its object to provide improved means for controlling the delivery of milk from the milk tubes into the cans.

To the above ends, the invention consists of the novel devices and combinations of devices hereinafter described and defined in the claims.

In the accompanying drawings which illustrate the invention, like characters indicate like parts throughout the several views.

Referring to the drawings: Figure 1 is a view in side elevation with some parts broken away; showing the improved device applied to a milk can; Fig. 2 is a plan view of the same; and Fig. 3 is a vertical section taken on the line $x^3$ $x^3$ of Fig. 2, some parts being broken away and some parts being removed.

The numeral 1 indicates a milk can of suitable construction, having, as shown, a large neck portion 2 normally closed by a cover 3. For the purposes of this case, it is not necessary that the cover 3 close the can with an air-tight joint, and in fact, the said cover, while a desirable feature in order to keep dirt out of the can, is not necessary to the operation of the improved device.

In its preferred form, this improved device for controlling the delivery of the milk into the can, comprises an outer casing 4, having an internal cylindrical piston valve seat 5 that is open both at its upper and lower ends, and the lower end of which projects downward into the can 1, the said casing 4 being suitably secured to the can. One or more milk inlet sleeves 6 open into the casing 4, preferably near the lower portion thereof; and a milk supply tube 7 is connected to each sleeve 6. Each milk tube 7 is connected to one or more teat cups of suitable construction.

An air suction tube or pipe 8—8ª leads from the top of the casing 4, and extends, preferably to a main air suction pipe, which in turn, is connected to a suitable air pump for producing the required suction or vacuum, and is also connected to a suitable pulsating device such as that disclosed and claimed in my prior patent No. 875,706, issued of date January 2nd, 1908.

The piston valve seat 5 is provided with a milk induction port 9, that opens into the bottom of the milk collecting chamber 10, which latter is formed within the casing 4 outside of the valve seat 5.

Working in the valve seat 5, is a heavy cylindrical piston-like valve 11 having a depending stem 12, to which a secondary valve 13 is attached. The downward movement of the two valves 11 and 13 is limited by a stop collar 14 applied to the lower ends of the valve seat 5, and engageable with the valve 13. This collar 14, at its sides, is cut away at 15 to afford discharge ports.

The air suction pipe above described, is shown as made up of a crooked metal section 8 and a rubber hose 8ª, which latter, of course, permits the can 1 to be moved about.

The operation of the device is as follows: Normally, the connected valves 11 and 13 are gravity held in their lowermost positions, shown in Fig. 3, in which position said valve 11 closes the port 9. When suction or partial vacuum is produced in the pipe 8—8ª, and also, of course, in the collecting chamber 10, and in the milk supply pipe 7, milk will be drawn from the teat cups into the said chamber 10, partially filling the same; and this same suction or partial vacuum will raise the valves 11—13, thereby causing the former to open up the port 9 and the latter to close the extreme lower end of the valve seat 5. When the port 9 is thus opened up, the milk drawn into the collecting chamber 10 will, under the action of gravity, flow through said port 9 into the valve seat 5 between the valves 11 and 13. Then, when the suction or partial vacuum is released by admission of air into the air pipe 8—8ª by an operation of the pulsating device, the valves 11—13 will be dropped back into their normal positions, shown in Fig. 3, thereby closing the port 9 and opening up the lower end of the valve seat 5, so that the milk accumulated in the said valve seat will freely flow through the ports 15 into the can 1. This action, it will be noted, is independent of whether or not the milk can is open to the atmosphere. In fact, the said can will preferably be subject to atmospheric pressure at all times.

The improved device, while extremely simple, and of small cost, is efficient for the purposes had in view.

What I claim is:

1. In a milking apparatus having means for producing pulsations, the combination with a milk supply tube and an air suction conduit connected therewith, of a valve mechanism arranged to intermittently connect a chamber to said milk supply tube and to a discharge port, substantially as described.

2. In a milking apparatus, the combination with a milk can or receptacle, of a casing having a valve seat arranged to discharge into said receptacle, a milk supply tube leading to said casing, an air suction tube leading therefrom, a primary valve working in said valve seat, subject to varying pressure or vacuum from within said casing, and arranged to open and close a port in the lower portion of the said casing, and a secondary valve carried by the said primary valve, and arranged to close the lower end of said valve seat when said primary valve is raised, and to open the same when said primary valve is lowered, substantially as described.

3. In a milking apparatus having means for producing pulsations, the combination with a milk can, of a milk supply tube, an air suction conduit connected to said milk supply tube, and a valve mechanism subject to pulsations and arranged to intermittently connect a valve controlled chamber to said milk supply tube and to said milk can, substantially as described.

In testimony whereof I affix my signature in presence of two witnesses.

EZRA E. GOOD.

Witnesses:
 H. D. KILGORE,
 F. D. MERCHANT.